F. W. TAYLOR.
MOLDING MACHINE.
APPLICATION FILED NOV. 29, 1909.
1,057,594.
Patented Apr. 1, 1913.
2 SHEETS—SHEET 1.
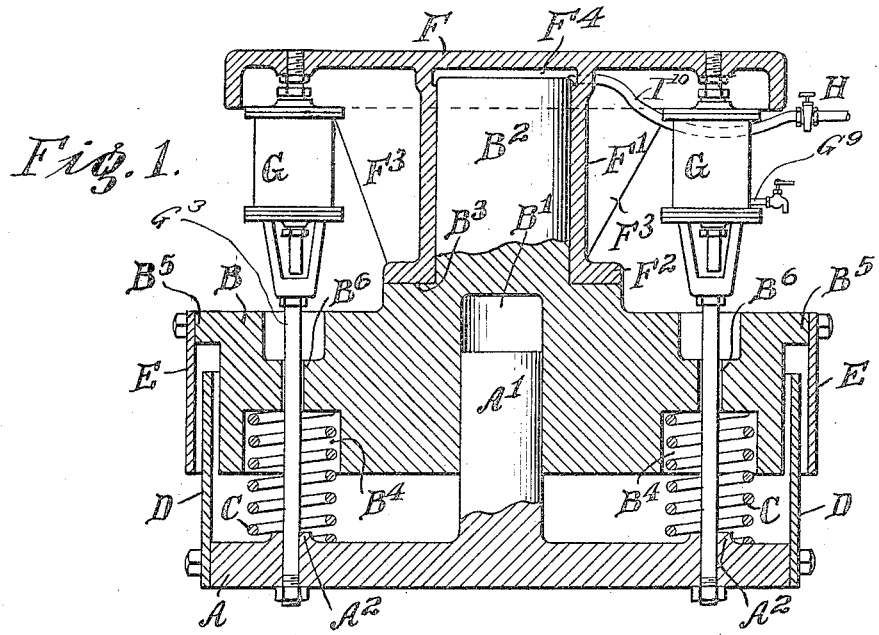
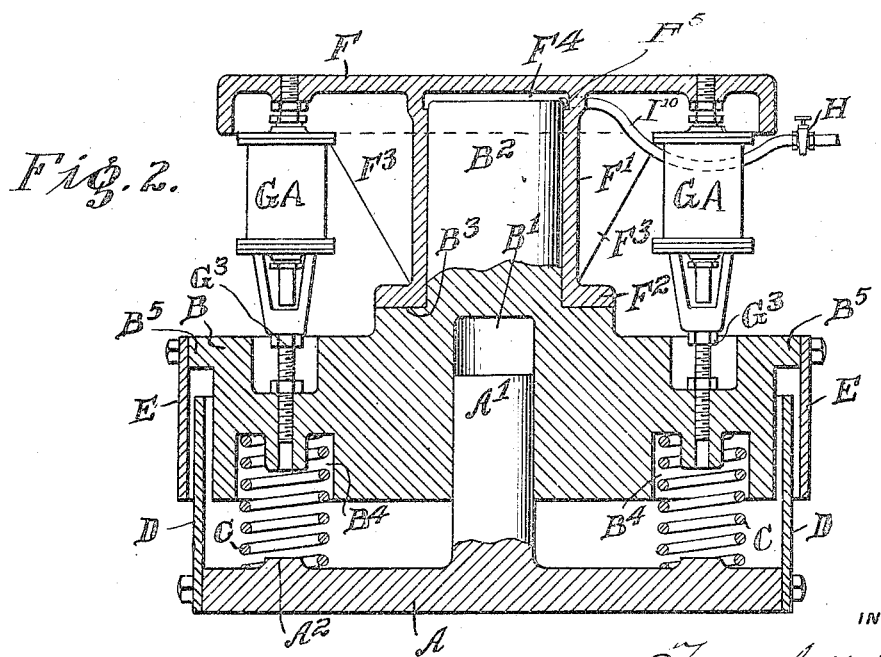
WITNESSES
INVENTOR
BY
ATTORNEY F. W. TAYLOR.
MOLDING MACHINE.
APPLICATION FILED NOV. 29, 1909.
1,057,594.
Patented Apr. 1, 1913.
2 SHEETS—SHEET 2.
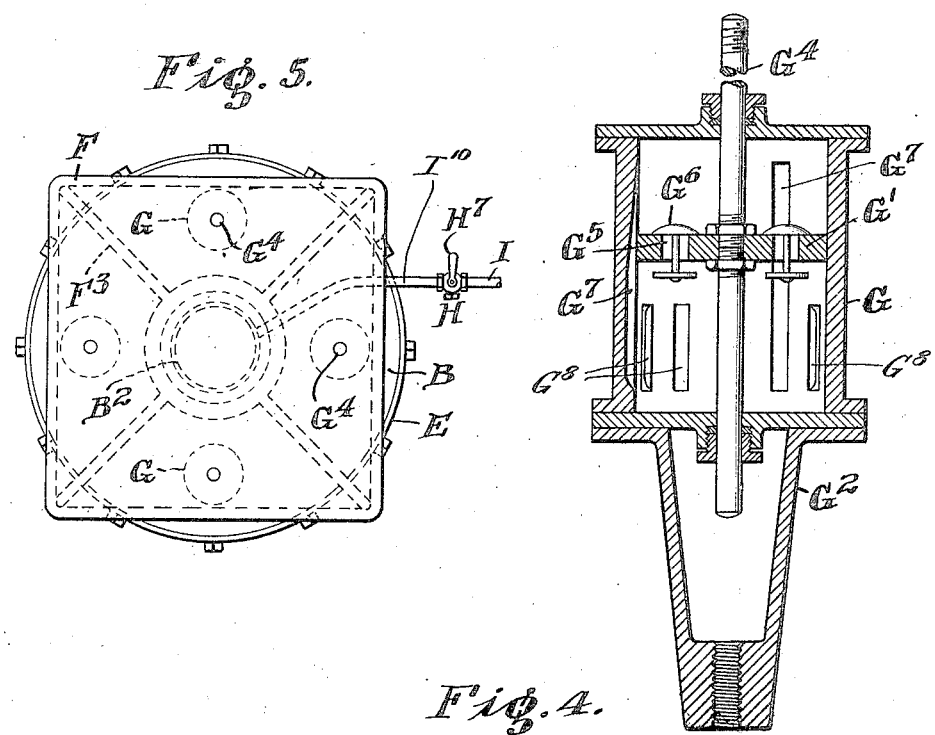
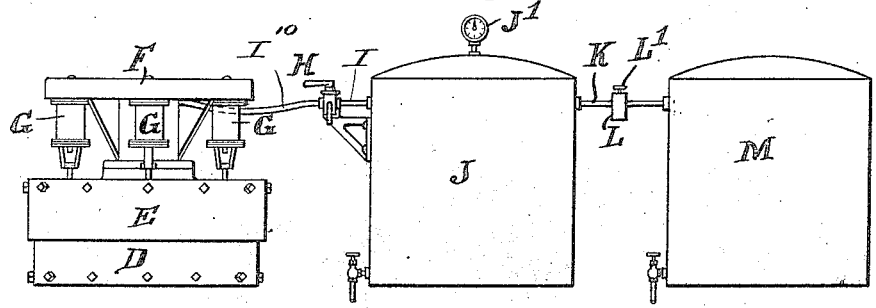
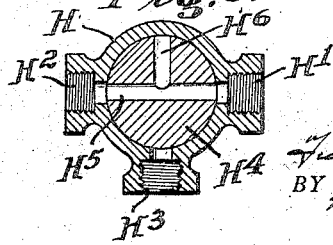

UNITED STATES PATENT OFFICE.

FREDERICK W. TAYLOR, OF PHILADELPHIA, PENNSYLVANIA, ASSIGNOR, BY MESNE ASSIGNMENTS, TO THE TABOR MANUFACTURING COMPANY, OF PHILADELPHIA, PENNSYLVANIA, A CORPORATION OF PENNSYLVANIA.

MOLDING-MACHINE.

1,057,594.	Specification of Letters Patent.	Patented Apr. 1, 1913.

Application filed November 29, 1909. Serial No. 530,289.

*To all whom it may concern:*

Be it known that I, FREDERICK W. TAYLOR, a citizen of the United States of America, residing in the city and county of Philadelphia, in the State of Pennsylvania, have invented a certain new and useful Improvement in Molding-Machines, of which the following is a true and exact description, reference being had to the accompanying drawings, which form a part thereof.

My present invention relates to jar molding machines of the kind in which a mold support and an anvil movable relative to each other are employed, and the sand or other mold forming material is compacted about the pattern or patterns by alternately separating the mold support and anvil and then causing them to collide,—the shock of collision settling the sand about the patterns.

More particularly my present invention relates to molding machines of the type described, and claimed in Letters Patent No. 941,999, granted Wilfred Lewis, November 30, 1909, in which provisions are made for giving movements to the anvil and mold support such that the momentum of each at the instant of impact is wholly or to a considerable extent destroyed by the momentum of the other, with a consequent avoidance of transmission of shock to the foundation on which the molding machine rests.

One of the principal objects of the present invention is to provide a machine of the character specified with suitable devices for directly and positively limiting the rising movement of the mold support, thus giving the mold support a definite and predetermined length of stroke or range of movement. Preferably the movement limiting devices employed are adjustable to permit the length of stroke of the mold support to be adjusted, and preferably also these devices are arranged to permit the mold support to move toward the anvil with substantial freedom while opposing the movement of the mold support away from the anvil, or at least the latter portion of said movement, with gradually increasing resistance, whereby the movement of the mold support away from the anvil is checked with a cushion action. I may limit the rising movement of the mold support either by connecting the controlling devices between the mold support and the base of the machine, or by connecting those devices between the mold support and the anvil itself.

A further object of the invention is to improve a machine of the type specified in certain of its general features of construction.

Besides the advantage of obtaining a positive limitation of the length of stroke of the mold support, the use of the stroke limiting devices of the character specified permits the effective use of a much simpler valve mechanism for controlling the admission of fluid under pressure to, and its exhaust from, the actuating chamber for causing the anvil and mold support to separate preparatory to collision when, as is usual, fluid pressure means are employed for bringing about such movement. The form of my invention in which the movement limiting devices are connected between the mold support and the base of the machine possesses certain important advantages because of the fact that with this form the rising anvil may be readily given an excess of momentum over that possessed by the falling mold support at the instant of collision. This permits of an easy and substantial variation in the force of the blow struck at collision and what is perhaps more important permits of the effective use of a lighter anvil and consequently less expensive machine as a whole for forming molds of a given size and weight, than would be otherwise possible.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described forms in which my invention may be embodied.

Of the drawings, Figure 1 is an elevation, partly in section, of a molding machine embodying one form of the present invention. Fig. 2 is a view similar to Fig. 1 showing a modified construction. Fig. 3 is a sectional elevation of one of the dash pot devices, the view being on a larger scale than Figs. 1 and 2. Fig. 4 is a diagram illustrating one means of supplying pressure fluid to the machines of Figs. 1 and 2. Fig. 5 is a plan view of the machine shown in Fig. 1, and Fig. 6 is a sectional plan of a controlling valve which may be used in the system shown in Fig. 4.

Referring to the drawings, A represents the base of the molding machine from the body of which extends a central upstanding piston or guide post A'. The anvil B of the molding machine comprises a disk like body portion formed with a central passage or cylinder space B' receiving the guide A'. The anvil B is provided at its upper end with an uprising piston B², and surrounding the lower end of the piston B² is an annular striking face or shoulder B³. The weight of the anvil and the load carried by it, is supported on a resilient cushion, formed, in the apparatus disclosed by a plurality of springs C, the lower ends of which surround bosses A² on the upper side of the body portion of the base member A, while the upper ends of the springs C enter sockets B⁴ formed in the underside of the anvil. To prevent the entrance of dirt or the like in the space between the lower side of the anvil and the base, telescoping tubular sections D and E, of sheet iron or the like, are secured to the base A and anvil B. The tubular section D is secured to the periphery of the base A, and the section E is secured to a shoulder or rib B⁵ projecting from the upper end of the anvil B at its periphery.

The mold support in the form shown comprises a mold supporting table F proper, and beneath the table F an integral hollow cylinder F', which receives the piston B² and is formed with a stiffened portion F² at its lower end engaging the striking face B³ of the anvil at collision.

F³ are stiffening ribs employed to connect the body of the table F with the cylinder F' as is usual. In the form shown, fluid under pressure, as compressed air, is admitted to and exhausted from the space F⁴ in the cylinder F' above the upper end of the piston B², through a flexible pipe I¹⁰ connected to a port F⁵ leading through the wall of the cylinder F' and controlled by the stationary valve H.

In the machine shown in Figs. 1 and 5 the means for limiting the rising movement of the mold support, include dash pots G and means for connecting the pistons and cylinders thereof between the mold support and base of the machine. In the form shown, the cylinder proper of each dash pot has a yoke G² secured to its under end and in threaded and adjustable engagement with a rod G³ which extends through the anvil B, passing through the corresponding spring socket B⁴ and a coaxial passage B⁶, and is secured at its lower end to the base A. The piston G' of each dash pot is connected by a stem G⁴ to the mold support. Each piston G' is formed with one or more ports G⁵ controlled by check valves G⁶ arranged to open and permit fluid to flow through the piston from the lower end to the upper end of the cylinder, but to close to prevent a flow through the piston in the opposite direction. In the inner surface of each cylinder wall one or more grooves or recesses G⁷ are formed, the cross sectional area of which decreases with the distance from the top of the cylinder. In consequence when the mold support moves away from the base of the machine, the damping fluid is at first able to flow with comparative freedom from the upper end of each cylinder into the lower end, but as the piston nears the upper end of the cylinder the resistance to its movement gradually increases, so that when the upper movement of the mold support is finally entirely checked there is no jar. In order that there may be no appreciable resistance to the movement of the mold support in either direction when the latter is adjacent the lower limit of its movement, one or more ports G⁸ may be formed in the side wall of the cylinder adjacent its lower end. The cylinders are completely filled by some liquid, such as oil, and to facilitate the filling of the cylinders and take care of the wastage, a valved connection G⁹ may be attached to each cylinder.

In the construction shown in Figs. 1 and 5, rods G³ serve as guide rods acting in conjunction with the central guide post A' to prevent the anvil from moving laterally or angularly about a vertical axis with respect to the base.

Any suitable means may be employed for introducing the pressure fluid to, and exhausting it from the cylinder space F⁴, but one of the advantages incident to the provisions for limiting the upward movement of the mold support is the fact that the valve mechanism for controlling the admission and exhaust of the pressure fluid, may be simpler than the valve mechanisms now in general use in jar molding machines. For instance, the simple manually actuated three way valve shown in section in Fig. 6 may be employed. In Fig. 6, H represents the valve casing having an inlet port H' connected to a pipe I leading from a source of fluid under pressure, and having a second port H² connected to the pipe I¹⁰ running to the cylinder space F⁴, and a third port H³ opening into the atmosphere directly. The port H² is alternately connected to the supply port H' or to the exhaust port H³ by the rotary valve member H⁴ formed with channels H⁵ and H⁶. The valve member H⁴ has secured to its stem a hand lever H⁷ by which it is operated.

It will be understood that with the apparatus described, the pressure of the air admitted to the cylinder space F⁴ must be such that the product of the pressure per square inch multiplied by the cross sectional area of space F⁴ equals or exceeds the weight of the mold support and the total load carried by it. At each admission of the pressure fluid to cylinder space F⁴, the mold support will be moved to the upper limit of its movement and the anvil will be forced down until the tension of the springs C balances the weight of the anvil and the piston B².

With the apparatus shown, when the total pressure exerted by the pressure fluid between the upper end of chamber F⁴ and the top of piston B², is in excess of the weight of the mold support and its load as the latter reaches the upward limit of its movement, the anvil is depressed thereby. This of course increases the tension of the springs and stores up energy in them which gives the anvil more momentum at the instant of the following collision than is possessed by the anvil. By regulating the amount of excess of anvil momentum a variation in the force of the blow struck may be obtained. Of course it will be understood that in general the excess of anvil momentum should not be great enough to throw the mold support violently to the upward limit of its movement with a consequent disturbance of flask, patterns and mold forming material, but this limitation does not prevent of a very substantial variation in the force of the blow struck. Moreover, as I have already pointed out, the possibility of giving the anvil a substantial excess of momentum over that possessed by the mold support, permits of the effective use of a lighter anvil and consequently less costly machine for forming a mold of given size or weight than would otherwise be possible.

With the apparatus shown the excess of anvil momentum may be obtained and regulated of course by supplying the chamber F⁴ with fluid from a high pressure source and regulating the pressure in chamber F⁴ by throttling the flow through the valve H. This regulation may be advantageously had also by regulating the pressure of the air supplied to the controlling valve H through the supply pipe I. In the arrangement shown in Fig. 4 the pipe I leads from an intermediate tank J connected to a main supply reservoir M by a pipe K including an automatic and adjustable pressure reducing valve L. As the construction of adjustable pressure reducing valves is well known, and as the details of the valve mechanism employed form no part of the present invention, I have not thought it necessary to illustrate in detail the construction of the valve L and it will be sufficient to say that the relation between the pressure maintained on the outlet side of the valve to the pressure on the inlet side of the valve may be varied by adjusting the handwheel L'. The pressure maintained in the chamber J may be indicated by a gage J' and should be so proportioned to the load on the mold support that the pressure multiplied by the cross sectional area of the chamber F⁴ exceeds the weight of the mold support and load carried by it by the desired amount. When so regulated, the momentum of the anvil will exceed the momentum of the mold support at impact to the desired extent.

It will be apparent that in the arrangement described, the valve mechanism is relatively simple and inexpensive, and that the operation of the apparatus is a simple matter. When the flask, set of patterns, and the mold forming material are in place on the mold support, and it is desired to compact the molding material, the operator simply throws the handle H⁷ into the position in which the valve H⁴ connects the channels H⁶ and H⁵ with the ports H' and H², and then after the mold support is raised and the anvil depressed, the valve handle H⁷ is thrown to close the port H' and connecting the ports H² and H³ together so that the pressure fluid may exhaust. The time at which the hand lever H⁷ is thrown does not materially affect the operation of the machine, though the best economy in air consumption is obtained by throwing the lever H⁷ back and forth in synchronism with the natural period of vibration of the spring supported anvil B, but a failure to move the valve lever in such synchronism does not materially affect the economy of air consumption, and in no wise endangers the mechanism or interferes with its effectiveness as a mold forming device, if the pressure in the source of fluid supplied to the chamber F⁴ is not unduly high. If the operating valve is not turned to connect the chamber F⁴ to exhaust as soon as the mold support and anvil reach their positions of maximum separation, the mold support does not move off the piston B² in any case, and if the supply pressure is regulated as in Fig. 4 the anvil exerts no increased pressure on the springs C.

When the valve L is employed the operator quickly learns to accurately adjust the valve L for any particular load on the mold support. The exact manner in which the valve L should be adjusted can be easily determined of course by manipulating the valve until the anvil is depressed to the desired level. The stroke of the mold support can be easily adjusted by adjusting the connection between the rods G³ and the corresponding yokes G², and this permits of a variation in the effect of the blow struck. It will be apparent of course that when the parts are at rest the level of the mold support will vary with the load supported by it and in consequence it is usually desirable to adjust the dash pot cylinders with substantial changes in load.

Instead of limiting the rising movement of the mold support by connections between the mold support and base, as in the machine shown in Fig. 1, the mold support may be directly connected to the anvil as shown in Fig. 2, where GA represents dash pot devices which may be identical with the dash pot devices G. In the construction shown in Fig. 2 the bolts G³ are directly but adjustably connected to the anvil. With the machine shown in Fig. 2, the maximum separation of the anvil and mold support is limited by the dash pots GA and any excess of the pressure fluid admitted to the cylinder space F⁴ beyond that necessary to move the mold support as far as the dash pots GA will allow it to move is useless and without effect. With this form of my invention the momentum of the anvil is always substantially equal in amount but opposite in direction to the momentum of the mold support at collision regardless of the pressure in the cylinder attached to the mold support.

The molding machine proper disclosed is obviously characterized by its simplicity and general mechanical excellence.

The form of the anvil and the manner in which it is supported permits the anvil to be made as heavy as seems desirable without unduly increasing the vertical dimensions thereof, and the machine as a whole requires little machining and may be readily assembled and taken apart when necessary for adjustments or repairs. It will be obvious to those skilled in the art, however, that the invention in its broad aspects is not limited to the particular apparatus disclosed, and that certain features of the invention may be advantageously used under some circumstances without a corresponding use of other features, and I do not wish the claims hereinafter made to be limited to the particular apparatus disclosed more than is made necessary by the state of the art.

Having now described my invention, what I claim as new and desire to secure by Letters Patent is,

1. In a jar molding machine, the combination of a base, an anvil mounted on said base and vertically movable with respect thereto, means providing a resilient cushion between the base and anvil, a mold support vertically movable relative to the anvil and base, means for causing the anvil and mold support to first separate and then collide, and connections positively limiting the rising movement of the mold support.

2. In a jar molding machine, the combination of a base, an anvil mounted on said base and vertically movable with respect thereto, means providing a resilient cushion between the base and anvil, a mold support vertically movable relative to the anvil and base, means for causing the anvil and mold support to first separate and then collide, and adjustable connections positively limiting the rising movement of the mold support.

3. In a jar molding machine, the combination of a base, an anvil mounted on said base and vertically movable with respect thereto, means providing a resilient cushion between the base and anvil, a mold support vertically movable relative to the anvil and base, means for causing the anvil and mold support to first separate and then collide, and connections positively limiting the rising movement of the mold support, said connections including cushioning devices arranged to exert an increasing retarding effect on the mold support as the latter reaches the limit of its movement.

4. In a jar molding machine, the combination of a base, an anvil mounted on said base and vertically movable with respect thereto, means providing a resilient cushion between the base and anvil, a mold support vertically movable relative to the anvil and base, means for causing the anvil and mold support to first separate and then collide, and connections positively limiting the rising movement of the mold support, said connections including one or more dash pots.

5. In a jar molding machine, the combination of a base, an anvil mounted on said base and vertically movable with respect thereto, means providing a resilient cushion between the base and anvil, a mold support vertically movable relative to the anvil and base, means for causing the anvil and mold support to first separate and then collide, and connections positively limiting the rising movement of the mold support, said connections including one or more dash pots, each including a piston and a cylinder and having provisions whereby the falling movement of the mold support is not impeded thereby while the latter portion of the rising movement of the mold support is opposed by a gradually increasing resistance.

6. In a jar molding machine, the combination of a base formed with an upstanding guide, a disk like anvil formed with a central passage receiving said guide and provided on its upper side with an upstanding piston, cushion springs between the base and anvil, a mold support formed with a hollow cylinder receiving said piston, and means for connecting the interior of said cylinder above said piston alternately to a source of fluid under pressure and to exhaust.

7. In a jar molding machine, the combination of a base formed with an upstanding guide, a disk like anvil formed with a central passage receiving said guide and provided on its upper side with an upstanding piston, cushion springs between the base and anvil, a mold support formed with a hollow cylinder receiving said piston, means for connecting the interior of said cylinder above said piston alternately to a source of fluid under pressure and to exhaust, and means for positively limiting the rising movement of the mold support.

8. In a jar molding machine, the combination of a base formed with an upstanding guide, a disk like anvil formed with a central passage receiving said guide and provided on its upper side with an upstanding piston, cushion springs between the base and anvil, a mold support formed with a hollow cylinder receiving said piston, means for connecting the interior of said cylinder above said piston alternately to a source of fluid under pressure and to exhaust, and telescoping tubular guards connected to the base and anvil and inclosing said springs.

9. In a jar molding machine, the combination of a base, an anvil mounted on said base and vertically movable with respect thereto, means providing a resilient cushion between the base and anvil, a mold support above the anvil and vertically movable with respect to the anvil and base, said anvil and mold support being provided, one with a cylinder and the other with a piston working therein, means for introducing pressure fluid to and permitting it to exhaust from said cylinder, and means for positively limiting the rising movement of the mold support.

10. In a jar molding machine, the combination of a base, an anvil mounted on said base and vertically movable with respect thereto, means providing a resilient cushion between the base and anvil, a mold support above the anvil and vertically movable with respect to the anvil and base, said anvil and mold support being provided, one with a cylinder and the other with a piston working therein, means for introducing pressure fluid to and permitting it to exhaust from said cylinder, and adjustable connections between the mold support and base positively limiting the movement of the mold support away from the base.

11. In a jar molding machine, the combination of a base, an anvil mounted on said base and vertically movable with respect thereto, means providing a resilient cushion between the base and anvil, a mold support above the anvil and base, said anvil and mold support being provided, one with a cylinder and the other with a piston working therein, means for introducing pressure fluid to and permitting it to exhaust from said cylinder, and connections between the mold support and base positively limiting the movement of the mold support away from the anvil, said connections including cushioning devices arranged to exert an increasing retarding effect on the mold support as the latter reaches the limit of its movement.

12. In a jar molding machine, the combination of a base, an anvil mounted on said base and vertically movable with respect thereto, means providing a resilient cushion between the base and anvil, a mold support above the anvil and vertically movable with respect to the anvil and base, said anvil and mold support being provided, one with a cylinder and the other with a piston working therein, means for introducing pressure fluid to and permitting it to exhaust from said cylinder, and connections between the mold support and base positively limiting the movement of the mold support away from the anvil, said connections including one or more dash pots, each including a piston and a cylinder connected one to the base and the other to the support.

13. In a jar molding machine, the combination of a base, an anvil mounted on said base and vertically movable with respect thereto, means providing a resilient cushion between the base and anvil, a mold support above the anvil and vertically movable with respect to the anvil and base, said anvil and mold support being provided, one with a cylinder and the other with a piston working therein, means for introducing pressure fluid to and permitting it to exhaust from said cylinder, and connections between the mold support and base positively limiting the movement of the mold support away from the base, said connections including one or more dash pots, each including a piston and a cylinder connected one to the base and the other to the support, and having provisions whereby the movement of the mold support toward the base is not impeded thereby, while the latter portion of the movement of the table away from the base is opposed by a gradually increasing resistance.

14. In a jar molding machine, the combination with an anvil member, of a mold support member, one of said members being provided with a vertical piston and the other with the coöperating cylinder into which fluid under pressure is admitted and from which it is permitted to exhaust to produce alternate separations of and collisions between the mold support and anvil members, and means acting positively on said mold support to restrict its rising movement.

15. In a jar molding machine, the combination with an anvil member, of a mold support member, one of said members being provided with a vertical piston and the other with the coöperating cylinder into which fluid under pressure is admitted and from which it is permitted to exhaust to produce alternate separations of and collisions between the mold support and anvil members, and adjustable means for acting positively on said mold support to restrict its rising movement.

16. In a jar molding machine, the combination with an anvil member, of a mold support member, one of said members being provided with a vertical piston and the other with the coöperating cylinder into which fluid under pressure is admitted and from which it is permitted to exhaust to produce alternate separations of and collisions between the mold support and anvil members, means, including cushioning devices acting positively on said mold support to restrict its rising movement.

17. In a jar molding machine, the combination of a base, a horizontally flattened anvil, cushion springs interposed between the base and anvil, a mold support, said mold support and anvil being provided, one with a vertical piston and the other with a coöperating cylinder, and means for connecting the interior of said cylinder alternately to a source of fluid under pressure and to exhaust.

18. In a jar molding machine, the combination of a base, a horizontally flattened anvil, vertical helical cushion springs interposed between the base and anvil, said anvil having apertures formed in it in line with said springs, vertical rods connected to said base at their lower ends and extending upward through said springs and said apertures, said mold support and anvil being provided, one with a vertical piston and the other with a coöperating cylinder, and means for connecting the interior of said cylinder alternately to a source of fluid under pressure, and to exhaust.

FREDERICK W. TAYLOR.

Witnesses:
 ARNOLD KATZ,
 S. STEWARD.